Dec. 8, 1931.  A. E. CLARK  1,835,693
TIRE TROUGH
Filed March 14, 1930
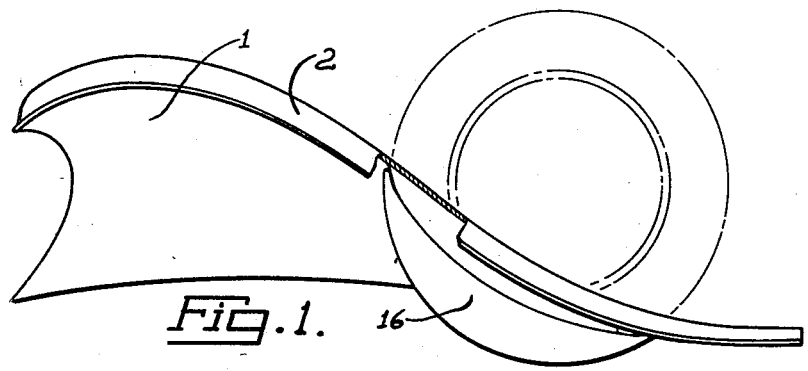
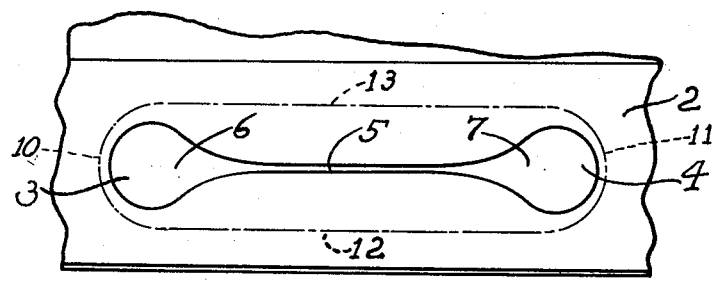
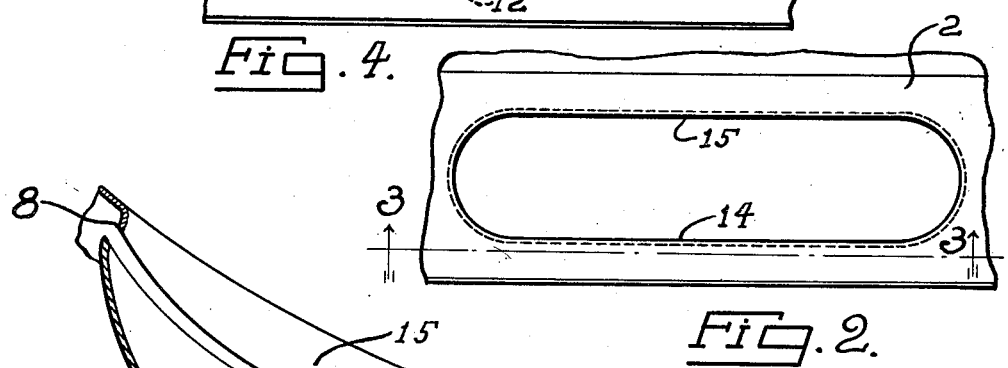
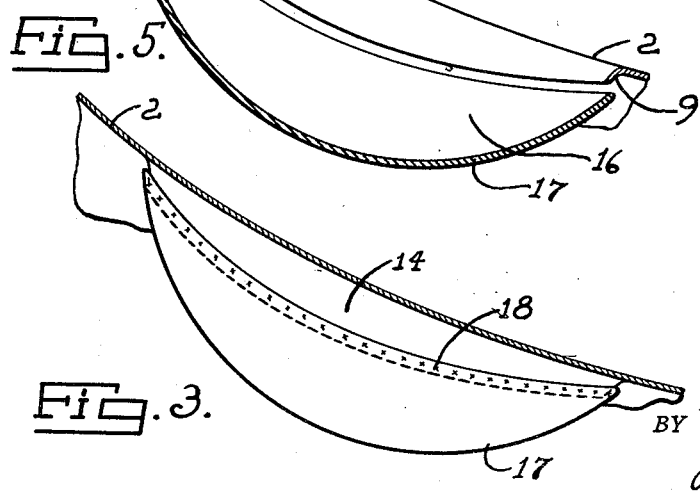
INVENTOR
ALBERT E. CLARK.
BY
ATTORNEY Patented Dec. 8, 1931

1,835,693

UNITED STATES PATENT OFFICE

ALBERT E. CLARK, OF DETROIT, MICHIGAN, ASSIGNOR TO CHRYSLER CORPORATION, OF DETROIT, MICHIGAN, A CORPORATION OF DELAWARE

TIRE TROUGH

Application filed March 14, 1930. Serial No. 435,909.

The main objects of this invention are to provide an improved tire trough of the type which supports a spare tire at the side of a vehicle on the front fender thereof; to provide a device of this kind of improved construction in which the stock of a fender that has heretofore been removed, constitutes portions of the sides of the trough; and to provide an improved method for forming the stock of a fender to which a tire trough is attached so as to obviate waste of the fender material.

An illustrative embodiment of this invention is shown in the accompanying drawings, in which:

Fig. 1 is a side elevation of a fender embodying my invention showing a tire supported thereon.

Fig. 2 is a fragmentary plan view of a fender showing the open end of a tire trough.

Fig. 3 is a vertical section taken on line 3—3 of Fig. 2.

Fig. 4 is a fragmentary plan view of a fender showing the same as it appears at one stage during the trough forming process.

Fig. 5 is a section similar to Fig. 3 showing the parts of the tire trough in position for assembling.

In the form shown, the front fender 1 has a laterally extending wall 2 which is inclined at its rear end portions. Formed in the wall 2 of the fender are spaced substantially circular apertures 3 and 4 which are slightly smaller in diameter than the diameter of the tire which the trough receives. The stock of the fender between the apertures 3 and 4 is severed longitudinally forming a slot 5 which has neck portions 6 and 7 communicating with the apertures 3 and 4.

Marginal flanges 8 and 9 formed of the stock of the fender are bent downwardly substantially along the dotted semi-circular lines indicated at 10 and 11 in Fig. 4. The fender stock which is located between the apertures 3 and 4 on respectively opposite sides of the slot 5 is bent downwardly along dotted lines 12 and 13 so as to form side flanges 14 and 15. The end flanges 8 and 9 and the side flanges 14 and 15 together form a tubular sleeve having a maximum length at its intermediate portion, a minimum length at its outer end portions and a gradually decreasing length between the intermediate and end portions.

Mounted on the sleeve formed by the flanges 8, 9, 14 and 15 is a crescent shaped receptacle 16 having an outer wall 17 conforming in curvature with the curvature of a tire. The edge portions of the open end of the receptacle 16 have a curvature which conforms with the curvature of the edge portions of the sleeve and the latter extends slightly into the opened end of the receptacle as shown in Fig. 3. The overlapping edge portions of the receptacle 16 and flanges 8, 9, 14 and 15 are welded together as illustrated at 18.

With the above construction, very little fender stock is actually removed from the fender so that waste is obviated. The downwardly bent side flanges 14 and 15 form substantial portions of the side walls of the tire trough and thus a receptacle having only a slight depth is required to complete the trough.

Although but one specific embodiment of this invention has herein been shown and described it will be understood that various changes including the size, shape and arrangement of parts may be made without departing from the spirit of my invention and it is not my intention to limit its scope other than by the terms of the appended claims.

I claim:

1. A tire trough comprising a support having an elongated aperture therein, a flange formed of the stock of said support and bounding said aperture, and a receptacle suspended from said flange having a curvature conforming to the curvature of a tire, the sides of said flange forming substantial portions of the sides of said trough.

2. In a fender, a flange formed of the stock of said fender and bounding an aperture therein, and a receptacle suspended from said flange having a curvature corresponding to the curvature of a tire, said flange being internal of the open end of said receptacle.

3. A tire trough comprising a support having spaced cut out portions and a restricted slot connecting said portions, the perimeter of said cut out portions and slot being bent downwardly, and a retainer secured to said downwardly bent perimeter.

4. In a vehicle fender, a flange formed of the stock of said fender and bounding an aperture therein, the sides of said flange being substantially one-half as wide as the width of said aperture, and a receptacle suspended from said flange.

5. In a vehicle fender, a flange formed of the stock of said fender and bounding an aperture therein, the sides of said flange being substantially one-half as wide as the width of said aperture and having bowed edges, and a receptacle suspended from said flange having upper side edges conforming with the shape of the sides of said flange and overlapping the same, the sides of said receptacle and flange forming spaced walls.

6. In a fender, a tire trough comprising a sleeve formed of the stock of said fender and bounding an aperture therein, and a casing suspended from the lower end portions of said sleeve, the sides of said sleeve constituting substantial portions of the sides of said trough.

ALBERT E. CLARK.